United States Patent
Arunachalam et al.

(10) Patent No.: US 9,526,059 B2
(45) Date of Patent: Dec. 20, 2016

(54) MOBILITY MANAGEMENT BASED ON CELL SIZE

(71) Applicant: Telefonaktiebolaget L M Ericsson (publ), Stockholm (SE)

(72) Inventors: Jagadeesh Arunachalam, Malmö (SE); Joakim Axmon, Kävlinge (SE); Bengt Lindoff, Bjärred (SE); Torgny Palenius, Barsebäck (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 134 days.

(21) Appl. No.: 14/400,584

(22) PCT Filed: May 14, 2013

(86) PCT No.: PCT/EP2013/001408
§ 371 (c)(1),
(2) Date: Nov. 12, 2014

(87) PCT Pub. No.: WO2013/170949
PCT Pub. Date: Nov. 21, 2013

(65) Prior Publication Data
US 2015/0111579 A1    Apr. 23, 2015

Related U.S. Application Data

(60) Provisional application No. 61/650,617, filed on May 23, 2012.

(30) Foreign Application Priority Data

May 16, 2012    (EP) .................................... 12168184

(51) Int. Cl.
*H04W 36/32* (2009.01)
*H04W 36/00* (2009.01)
*H04W 48/20* (2009.01)

(52) U.S. Cl.
CPC ......... *H04W 36/32* (2013.01); *H04W 36/0083* (2013.01); *H04W 48/20* (2013.01)

(58) Field of Classification Search
CPC .............................. H04W 36/32; H04W 64/00
See application file for complete search history.

(56) References Cited

U.S. PATENT DOCUMENTS 6,181,944 B1 *   1/2001   Uebayashi ................ G01S 5/14
                                                       455/456.2
6,654,608 B1 *   11/2003  Monell ................. H04W 52/50
                                                       370/332

(Continued)

FOREIGN PATENT DOCUMENTS

| EP | 2385725 A1 | 11/2011 |
| EP | 2104389 B1 | 5/2012 |
| WO | 2011123006 A1 | 10/2011 |

OTHER PUBLICATIONS

Nokia Siemens Networks, et al., "UE MSE and HetNet Mobility", 3GPP TSG-RAN WG2 Meeting #77, Dresden, Germany, Feb. 6, 2012, pp. 1-8, R2-120524, 3GPP.

(Continued)

*Primary Examiner* — Nathan Mitchell
*Assistant Examiner* — Ernest Tacsik
(74) *Attorney, Agent, or Firm* — Coats & Bennett, P.L.L.C.

(57) ABSTRACT

A mobility management method of a wireless communication device is disclosed. The method comprises receiving a first signal related to a first cell, determining a size of the first cell based on the first signal, receiving a second signal related to a second cell, and determining a size of the second cell based on the second signal. The method further comprises scaling at least one mobility parameter based on the determined sizes of the first and second cells, and performing mobility management in the second cell based on the (Continued)

scaled mobility parameters. Corresponding computer program product, arrangement and devices are also disclosed.

25 Claims, 2 Drawing Sheets

(56) References Cited

U.S. PATENT DOCUMENTS

| | | | | |
|---|---|---|---|---|
| 2002/0119748 | A1* | 8/2002 | Prax | H04B 7/145 455/7 |
| 2004/0147269 | A1* | 7/2004 | Kim | G01S 5/0054 455/456.2 |
| 2006/0125692 | A1* | 6/2006 | Wang | G01S 5/0252 342/451 |
| 2007/0298798 | A1 | 12/2007 | Hagerman et al. | |
| 2009/0092111 | A1* | 4/2009 | Horn | H04W 48/02 370/338 |
| 2009/0298496 | A1* | 12/2009 | Pettersson | H04W 36/32 455/434 |
| 2011/0021201 | A1* | 1/2011 | Lee | H04W 48/20 455/444 |
| 2011/0021210 | A1* | 1/2011 | Medapalli | G01S 5/0205 455/456.2 |
| 2011/0045833 | A1 | 2/2011 | Kazmi | |
| 2011/0263262 | A1 | 10/2011 | Min et al. | |

OTHER PUBLICATIONS

New Postcom, "UE Mobility state estimation in HetNet", 3GPP TSG RAN WG2 Meeting #75bis, Oct. 10, 2011, pp. 1-4, R2-115314, 3GPP.

ITRI, "Discussion on mobility state detection for HetNet", 3GPP TSG-RAN WG2 #75, Athens, Greece, Aug. 22, 2011, pp. 1-4, R2-114219, 3GPP.

Yixue, L., et al., "Enhanced Mobility State Detection Based Mobility Optimization for FEMTO Cells in LTE and LTE-Advanced Networks", IET International Conference on Communication Technology and Application (ICCTA 2011), Oct. 14, 2011, pp. 1-5, IET.

3rd Generation Partnership Project, "3rd Generation Partnership Project; Technical Specification Group Radio Access Network; User Equipment (UE) procedures in idle mode and procedures for cell reselection in connected mode (Release 8)", 3GPP TS 25.304 V8.0.0, 5.2.6.1.5, Jan. 7, 2008, pp. 27-29, 3GPP, France.

3rd Generation Partnership Project, "3rd Generation Partnership Project; Technical Specification Group Radio Access Network; Evolved Universal Terrestrial Radio Access (E-UTRA); User Equipment (UE) procedures in idle mode (Release 9)", Technical Specification, 3GPP TS 36.304 V9.3.0, Jun. 1, 2010, pp. 1-33, 3GPP.

Research in Motion UK Limited, "UE RRC mobility states mismatch between UTRAN and E-UTRAN", 3GPP TSG-RAN WG2 Meeting #77, Dresden, Germany, Feb. 6, 2012, pp. 1-3,—R2-120456, 3GPP.

3rd Generation Partnership Project, "LTE; Evolved Universal Terrestrial Radio Access (E-UTRA); Medium Access Control (MAC) protocol specification (3GPP TS 36.321 version 9.0.0 Release 9)", Technical Specification, ETSI TS 136 321 V9.0.0, Oct. 1, 2009, pp. 1-49, ETSI.

3rd Generation Partnership Project, "User Equipment (UE) procedures in idle mode and procedures for cell reselection in connected mode (3GPP TS 25.304 version 8.7.0 Release 8)", Technical Specification, ETSI TS 125 304 V8.7.0, Sep. 1, 2009, pp. 1-51, ETSI.

3rd Generation Partnership Project, "3rd Generation Partnership Project; Technical Specification Group Radio Access Network; Radio Resource Control (RRC); Protocol specification (Release 11)", Technical Specification, 3GPP TS 25.331 V11.1.0, Mar. 1, 2012, pp. 1-1911, 3GPP, France.

* cited by examiner

MOBILITY MANAGEMENT BASED ON CELL SIZE

TECHNICAL FIELD

The present invention relates generally to the field of mobility management in wireless communication systems.

BACKGROUND

Mobility of a wireless communication device in a wireless communication system typically involves re-selection and handover procedures (commonly referred to herein as cell switch procedures). Re-selection is initiated by the wireless device and is typically applied when the device is in modes like e.g. idle mode or CELL_FACH, while handover is initiated by the system network based on measurement reports from the wireless device and is typically applied when the device is in modes like e.g. CELL_DCH.

In many system scenarios different radio access technologies (RAT) may co-exist, and cell switches may occur between cells both intra-RAT and inter-RAT. Examples of different radio access technologies are WCDMA (UTRA-FDD), LTE (E-UTRA) and TD-SCDMA (UTRA-TDD, LCR) (all according to the 3GPP specifications). In some scenarios, cell switches may be frequent due to e.g. high speed of the device, the device requesting various services (provided by different RATs), hierarchical or heterogeneous cell structures, etc.

Mobility management (both inter-RAT and intra-RAT) commonly involves cell switch parameters (such as e.g. Treselection, Time-To-Trigger and Qhyst according to the 3GPP specifications) and mobility parameters (such as e.g. Tcr and Ncr according to the 3GPP specifications). The cell switch parameters are typically used to determine when to perform a cell switch and the mobility parameters are typically used to determine how fast the wireless communication device is moving.

For the purpose of this disclosure, the cell switch parameters (typically provided to a device by the network) will function according to any suitable known or future method, and will thus not be elaborated on. It is noted, however, that one or more of the cell switch parameters may be scaled in the wireless communication device based on an estimated speed of the device. For example, a device moving at high speed may require a lower Treselection value than the default value to not lose service. In one example, a scaling factor is applied that has different values depending on which mobility state the device is in. Various standards may have different mobility state terminology (e.g. low/medium/high or normal/high).

The mobility state may also be used to control if the device prefers a macro or micro/pico cell of a hierarchical cell structure (HCS). Typically, a device in high mobility should not camp of micro/pico cells, while a device in normal/low mobility should camp on a cell having a highest HCS priority.

Which mobility state a device is in may be determined based on one or more of the mobility parameters. The mobility parameters are typically related to the cell switch frequency. For example, a device may count the number of cell switches it performs during a time window (e.g. Tcr) and compare this number to one or more thresholds (e.g. Ncr) to determine which mobility state it is in (a high number of cell switches typically indicates high mobility and vice versa).

However, there is a problem with directly applying the cell switch count above when cell switches between cells of different sizes take place. This is because the count value will differ much between a scenario where there are many small sized cells and a scenario where there are mainly large sized cells, even if the device is moving with the same speed. Hence, the corresponding mobility states determined in these two scenarios will not both accurately describe the factual conditions.

This is particularly seen in heterogeneous networks (use of multiple types of access nodes in a wireless network). An example of a heterogeneous network is where a Wide Area Network use macrocells, picocells, and/or femtocells in order to offer wireless coverage in an environment with a wide variety of wireless coverage zones, ranging from an open outdoor environment to office buildings, homes, and underground areas. In some employments, a heterogeneous network could be as a network with complex interoperation between macrocell, small cell, and in some cases WiFi network elements used together to provide a mosaic of coverage, with handoff capability between network elements.

A similar problem arises in a network situation where the cell sizes are dynamically adaptable (e.g. autonomous or self-optimizing networks). In such situations the size of a cell may change over time based on e.g. current traffic load and capacity of the cell and its neighbors. Since the cell sizes are dynamic, it will not be appropriate to apply the above procedures (cell switch count and cell switch parameters) in such networks.

This problem has been observed in US 2011/0021201, where a method is disclosed of determining a mobility state based on the number of cell reselections and a size of the cell to be reselected. In that disclosure, a reselection to a cell having a small cell size is not counted in the number of cell reselections. Thus, micro cells will not affect the mobility state determination. However, this solution will only be effective in a hierarchical cell structure system.

"Enhanced mobility state detection based mobility optimization for femto cells in LTE and LTE-advanced networks", by Lei Yixue and Zhang Yongsheng, 2011 IET International Conference on Communication Technology and Application, discloses mobility management for femto cells where it is assumed that UE can distinguish the type of neighboring cell, i.e. femto cell or macro cell. The cell crossing counting for femto cell is weighted before adding to the total cell crossing. However, this solution assumes that the average cell size of macro cell and femto cell is known.

Another general problem is that for inter-RAT cell switches, the mobility state and/or the cell switch counter is commonly reset after the inter-RAT cell switch. For example, when switching from WCDMA to LTE, the mobility state is set to a default value indicating normal mobility regardless if the device was in high mobility in WCDMA. Furthermore, the cell switch counter is reset to zero, so a number of new cell switches first have to be performed within a time limit for the device to transform to a high mobility state. Until then, even if the device is moving at high speed, it is considered to be in normal mobility. This may lead to non-optimal performance for the device in LTE and a corresponding decision to switch back to WCDMA.

Typically, the cell sizes in a network depend on factors like requirements on the number of users to be supported per cell and other capacity requirements. Since the capacity planning requirements could be different for different RATs, the cell sizes could be different as well. Thus, the problem with directly applying the cell switch count when cell switches between cells of different sizes take place is particularly relevant for inter-RAT cell switches.

Both these problems imply that the mobility state of a device may not always be adequate, and thus appropriate scaling for the cell switch parameters is not always performed. Hence, there is a risk of e.g. connection drops, out-of-service, and unnecessary inter-RAT cell switches.

Therefore, there is a need for improved mobility management.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object to obviate at least some of the above disadvantages and to provide methods, arrangements, wireless communication devices and computer program products that provide for improved mobility management.

According to a first aspect, this is achieved by a mobility management method of a wireless communication device capable of communication with a wireless communication network according to at least a first radio access technology. The method comprises receiving a first signal related to a first cell, determining a size of the first cell based on the first signal, receiving a second signal related to a second cell, and determining a size of the second cell based on the second signal.

The method further comprises scaling at least one mobility parameter based on the determined sizes of the first and second cells, and performing mobility management in the second cell based on the scaled mobility parameters.

The first and second signals may, for example, be received from the wireless communication network. In some embodiments, one or more of them might be received from another source (e.g. cell size information provided by an app or an Internet site).

The size may be determined as a cell radius (e.g. distance from cell border to base station) or diameter. The cell size determination may be quantized in some embodiments (e.g. defining the size as being closest to one of a number of values, or as falling between certain threshold values).

As will be explained further in the following, the mobility parameters may comprise any suitable metrics, measurements or values relating to cell switch frequency (e.g. a cell switch counter value and/or network provided mobility parameters).

In some embodiments, the wireless communication device may be capable of communication with a wireless communication network according to at least a first and a second radio access technology, wherein the first cell may operate according to the first radio access technology and the second cell may operate according to the second radio access technology. Examples of radio access technologies include WCDMA (UTRA-FDD), LTE (E-UTRA) and TD-SCDMA (UTRA-TDD, LCR) (all according to the 3GPP specifications).

In some embodiments, at least one of the first and second cell sizes may be comprised in the first and second signal respectively. For example, the cell size value itself or a cell size indication may be signaled by the network. Thus, determining a cell size may comprise reading the cell size comprised in the respective signal.

In some embodiments, at least one of the first and second cell sizes may be calculated by the wireless communication device based on the first and second signal respectively. Thus, determining a cell size may comprise calculating the cell size based on the respective signal.

In some embodiments, the calculation may be based on an alteration of a signal transmitted from a base station of the respective cell and received at the wireless communication device. For example, the alteration may comprise one or more of an attenuation experienced by a signal transmitted from a base station of the respective cell and received at the wireless communication device, and a delay experienced by a signal transmitted from a base station of the respective cell and received at the wireless communication device. The signal transmitted from a base station of the respective cell may or may not be the first and second signal respectively.

The cell size may be calculated as an estimated distance from the wireless communication device to a base station of the respective cell when the wireless communication device performs a cell switch. The cell size calculation may be based on signals received when the wireless communication device performs a cell switch. A cell switch may comprise a cell re-selection and/or a cell handover. The distance may be estimated based on a timing advance indication (which is one example of an indication of delay between base station and device) received from the respective cell and/or based on a power (which is one example of an indication of attenuation between base station and device) of a reference signal received from the respective cell. The cell size calculation may be based on positioning information of the wireless communication device and of a base station of the respective cell.

In some embodiments, an overlap of the cells under consideration may also be an input to the size calculation. For example, size calculation may be (at least partly) based on a hysteresis value (e.g. Qhyst) signaled by the network and used for cell switch determination.

A large hysteresis value may be indicative of a large cell overlap and vice versa. Determining a cell overlap size from a hysteresis value may, for example, be done based on statistics of historical hysteresis values mapped to cell overlap sizes.

As another example, a cell overlap may be considerable in comparison to a cell radius in particular for small cells. Thus, in some embodiments, an overlap may be added to the first calculated cell size to determine a final cell size. Determining an overlap distance from a hysteresis value may, for example, be done based on statistics of historical hysteresis value mapped to overlap distances. Determination of an overlap distance may, for example, be performed by mapping positioning information to the respective hysteresis conditions.

At least one mobility parameter may be scaled by a ratio between the determined sizes (e.g. radii or diameters) of the second and first cells according to some embodiments. For example, a mobility parameter may be multiplied or divided by the ratio.

The method may further comprise performing the cell switch from the first cell to the second cell. Performing mobility management in the second cell based on the scaled mobility parameters may comprise determining an initial mobility state of the second cell based on the scaled mobility parameters and possibly scaling cell switch parameters of the second cell based on the initial mobility state. The cell switch parameters may include parameters relating to signal strength measurements (e.g. Treselection, TTT, Qhyst) and are to be used in a further cell switch decision (e.g. a re-selection decision by the device and/or a handover decision by the network based on reports indicative of the cell switch parameters). Performing mobility management in the second cell may also comprise updating the mobility parameters appropriately when applicable (e.g. updating the cell switch count when a cell switch occurs and/or updating network transmitted parameters when received from the network).

A second aspect is a computer program product comprising a computer readable medium, having thereon a computer program comprising program instructions, the computer program being loadable into a data-processing unit and adapted to cause the data-processing unit to execution of the method according to the first aspect of the invention when the computer program is run by the data-processing unit.

According to a third aspect, an arrangement is provided for a wireless communication device capable of communication with a wireless communication network according to at least a first radio access technology. The arrangement comprises a receiver adapted to receive a first signal related to a first cell and a second signal related to a second cell, and a processor adapted to determine a size of the first cell based on the first signal and a size of the second cell based on the second signal.

The processor is further adapted to scale at least one mobility parameter based on the determined sizes of the first and second cells. The arrangement also comprises a mobility manager adapted to perform mobility management in the second cell based on the scaled mobility parameters.

In some embodiments, the receiver comprises a first receiver of a first radio access technology and a second receiver of a second radio access technology.

The arrangement may further comprise a positioning unit. Then, the processor may be further adapted to determine the cell size based on positioning information of the wireless communication device and of a base station of the respective cell.

A fourth aspect is a wireless communication device comprising the arrangement according to the third aspect.

A fifth aspect is a network node of the wireless communication network adapted to transmit a signal comprising cell size information related to at least a cell served by the network node. The network node may also be adapted to transmit a signal comprising cell size information related to one or more neighboring cells according to some embodiments.

In some embodiments, the third and fourth aspects may additionally have features identical with or corresponding to any of the various features as explained above for the first aspect.

An advantage of some embodiments is that the scaling of mobility parameters ensures that these parameters are correct for continuous use throughout cell switches between cells of different sizes.

According to embodiments, the scaled mobility parameters are applied directly after an inter-RAT cell switch instead of resetting the mobility parameters and mobility state. Thus, a further advantage of some embodiments is that the scaling of mobility parameters ensures that these parameters may be used across inter-RAT cell switches.

Another advantage of some embodiments is that a more accurate mobility state determination is provided, which in turn provides correct scaling of the cell switch parameters.

A further advantage of some embodiments is that the number of connection drops, out-of-service, and/or unnecessary (inter-RAT and intra-RAT) cell switches is reduced.

For example, if a device switches to a UTRA-FDD HCS from E-UTRA, embodiments provide for that the device can directly camp on the cell with the correct HCS priority (e.g. the macro cell if high mobility is detected). Thus, the number of unnecessary cell switches in a high mobility state is reduced.

Furthermore, by using scaled parameters according to some embodiments, a device has a higher probability of staying in the new RAT after inter-RAT cell switch.

Some embodiments provide for lower power consumption. For example, when a device detects an out-of-service state, it triggers emergency measurements on all RATs, which typically has a negative effect on the power consumption. A lower probability of out-of-service provides for lower power consumption.

Another advantage of some embodiments is that it is applicable to any type of cell structure, e.g. hierarchical, non-hierarchical, heterogeneous, single RAT, multi RAT, different cell sizes, self-optimizing, etc.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where a wireless communication device, for the purpose of a cell switch (e.g. cell re-selection or cell handover), determines the respective size of the cell it switches from (old cell) and the cell it switches to (new cell). Mobility parameters (e.g. relating to cell switch frequency) are scaled based on the determined sizes and applied in the new cell after the cell switch has been performed. The term mobility parameters may in this disclosure comprise, for example, a cell switch counter value and/or mobility parameters provided by the network (e.g. Tcr and Ncr).

In some embodiments, the cell switch counter is scaled and the mobility parameters provided by the network are used unchanged in the new cell. In some embodiments, some or all of the mobility parameters provided by the network are scaled and the cell switch count is used unchanged in the new cell. In some embodiments, the cell switch counter and one or more of the mobility parameters provided by the network are scaled before being used in the new cell.

This procedure improves mobility management of the wireless communication device. The scaling of mobility parameters provide for accurate mobility detection (and corresponding mobility state setting) after the cell switch even when the size of cells is varying throughout the network, which in turn leads to accurate cell switch parameter setting and better mobility performance.

Figure 1:
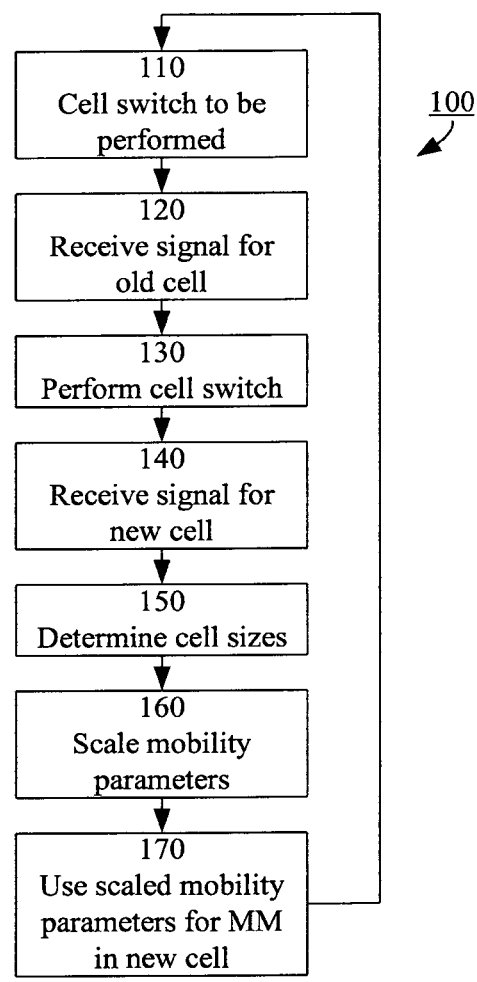
FIG. 1 is a flowchart illustrating example method steps according to some embodiments.

FIG. 1 illustrates a method 100 for a wireless communication device according to some embodiments. The method is applicable when a cell switch (from an old cell to a new cell) is to be performed, as indicated in 110.

A signal relating to the old cell is received in 120. The signal may be received from a network related to the old cell, e.g. from a network node serving the old cell or from a network node serving a neighboring cell of the old cell.

Alternatively, it may be received from another source. For example, the signal may be received from the Internet on an application layer via any Internet connection (cellular, WLAN, Bluetooth, etc) of the wireless communication device. The signal may comprise a direct indication of the size of the old cell. Alternatively, the signal may comprise no direct indication of the size of the old cell, but may be used by the device to determine the size of the old cell. Examples of signaling relevant for these purposes will be described further in connection to various examples relating to the cell size determination.

In 130, the cell switch procedure is performed according to any suitable known or future method (e.g. re-selection or handover procedures as described in 3GPP specifications).

A signal relating to the new cell is received in 140. As for the signal relating to the old cell, the signal may be received from a network related to the old cell or from another source. The signal may or may not comprise a direct indication of the size of the new cell, and may in any case be used by the device to determine the size of the new cell.

The sizes of the old cell and the new cell are determined in 150 based in the respective signals received in 120 and 140. The determination may be by actual knowledge of the true cell size (e.g. in the case of a direct indication of the respective signal) or by estimation based on the respective signal, as will be exemplified in the following.

At least one mobility parameter is scaled in 160, and the scaled at least one parameter is applied in the mobility management operation of the new cell in 170. The one or more mobility parameter to be scaled in 160 may relate to the old cell (e.g. a cell switch count applicable in the old cell) or may be a mobility parameter of the new cell (e.g. mobility parameters provided by the network for the new cell). The scaling in 160 is based on both the size of the old cell and the size of the new cell. For example, one or more of the mobility parameters may be multiplied or divided as applicable by a scaling factor corresponding to the ratio between the new cell size and the old cell size. In one example, the cell switch count of the old cell is divided by the ratio between the new cell size and the old cell size and then used together with the network provided mobility parameters in the new cell. In some embodiments, the scaling does not have to be exactly according to the cell size ratio. The ratio may first be mapped to a plurality of quantized ratio values (e.g. 0.5, 1, 2 or a finer resolution) and then used for the scaling. The quantization levels may or may not be uniformly distributed. In fact the scaling factor may be determined as any suitable function of the cell size ratio (e.g. sqrt(ratio) or (ratio)^2).

The mobility parameters to be scaled may comprise Tcr and/or Ncr according to 3GPP specifications and/or the counter value representing the number of historical cell switches during a specified time frame. The mobility parameters to be scaled typically relate to the cell switch frequency. For example, when moving to a smaller cell the counter number may be increased to indicate that the same speed of the device would result in more cell switches for the smaller cell. Alternatively, the mobility state threshold(s) Ncr may be decreased.

The application of the scaled mobility parameters in the mobility management operation of the new cell in 170 may comprise determining an initial mobility state of the second cell based on the scaled mobility parameters, and may further comprise scaling cell switch parameters of the new cell based on the initial mobility state. As more cell switches are preformed, the scaled mobility parameters may, of course, be further updated. Similarly, as the speed of the device may change, the mobility state may, of course, be changed.

In relation to FIG. 1, it should be noted that the signal reception (120) and cell size determination (150) related to the old cell may be performed at any time while the device is in the old cell, and not necessarily in connection to the cell switch as indicated in FIG. 1. For example, the size of the old cell may have been determined at a previous cell switch (when the old cell was a new cell) and may have been stored in the device. In fact, the device may store any previously determined cell sizes (e.g. in relation to the items of a history list). In such embodiments, it can happen that the sizes of both the new and old cell are already known (i.e. 120, 140, 150 has already been performed) at the time of the cell switch. In another example, the cell size may be provided even at a time when the device is not in the relevant cell (e.g. if provided via a cell size database on the Internet or if provided by a neighboring cell of the cellular network). In some embodiments, the history of a device is used alone or in combination with new information to determine the cell sizes.

Various implementation examples of 120, 140 and 150 will now be described. It is noted that each example may be applied to the size determination for the old cell and/or the new cell. Therefore, we will only refer to cell size determination in general terms hereafter.

The device may use the determined distance directly or quantify it (e.g. use it as an indication of whether the cell is small, medium or large).

In some embodiments, cell size information is explicitly comprised in a signal from the network or from another source. The signal may be a dedicated signal (e.g. DPCH), a broadcast signal (e.g. System Information, MIB/SIB), or shared channel (HS-SCCH/HS-PDSCH or PDCCH/PDSCH). The device could receive the cell size information for a specific cell from a network node serving that specific cell. Alternatively or additionally, a network node may provide a list of sizes of cells served by network nodes in the vicinity (e.g. adjacent/neighboring nodes). The information may be provided by the current serving network node or a node controlling the relevant base station (e.g. RNC). In some embodiments, the cell size information may be provided on a higher (e.g. application) layer. The node delivering such information could be a database in a server (e.g. an Internet server) and it may be received via any Internet connection of the wireless communication device.

In the embodiments where the cell size information is explicitly comprised in the received signal, the device determines the cell size by simply reading the cell size information (possibly after demodulation and decoding). The cell size information may be provided as a parameter corresponding to the cell radius or diameter (e.g. in meter, km, etc) or according to a table look up (e.g. a provided value corresponds to a cell size range).

In other embodiments, the cell size information is not explicitly comprised in a received signal. In such embodiments, the device use the received signal related to a cell to estimate the size of that cell.

A cell switch typically takes place when a device leaves the coverage area of the old cell and enters the coverage area of the new cell. Generally speaking, this is the point where the experienced signal strength of the new cell is higher than the experienced signal strength of the old cell. The distance from this point to the location of the network nodes serving the old and new cells respectively may be used as an approximation of the radius for the respective cells. (The latter is only true for the smaller (e.g. micro/pico) cell in a cell switch of hierarchical systems. The cell size of the macro cell should be approximated using a location related to the cell border of the macro cell and/or another method.)

One example of how the distance from the device to the location of the network node serving the relevant cell (hereafter also referred to as the cell centre) may be achieved is by use of a timing advance signaling from the relevant network node. Such a signal may, for example, be provided as part of a random access procedure (e.g. RACH as described in 3GPP specifications).

In many cell switch scenarios, the wireless communication device will perform a local registration procedure including a random access procedure (e.g. reselection from UTRA-FDD to E-UTRA) and/or a random access procedure only (e.g. intra- and inter-RAT handover for UTRA-FDD and E-UTRA) towards the new cell as part of the cell switch procedure.

In a typical random access procedure, the device gets timing advance information (e.g. TA) from the network node. This timing advance signal may be used as the received signal of 120 and/or 140 of FIG. 1. Provided that the device aligns uplink and downlink sub-frame timing when initiating the random access procedure, the timing advance will represent the propagation time for twice the distance between the network node and the device. Thus, the distance (in meters) between the network node and the device can be approximated as:

$$\text{distance} = \text{timing advance} \cdot \frac{c}{2}$$

where the timing advance is in seconds and c is the speed of light in meters per second. If the device has not aligned uplink and downlink timing, the miss-alignment has to be accounted for by compensating the timing advance based on the known separation between uplink and downlink timing before the equation above is applied, so that "timing advance" in the above equation is a good representation of the propagation time for twice the relevant distance.

Another example of how the distance from the device to the location of the cell centre may be achieved is by signal strength measurements of a received signal.

In the example of UTRA-FDD, the device may measure the RSCP (received signal code power) of the primary CPICH. In the example of E-UTRA LTE, the device may measure the RSRP (reference signal received power) of the common reference symbols (CRS). This measurement is typically performed and used as an input to cell switch decisions, but may be used to estimate the cell size as well.

Since the transmission power $P_{TX}$ used for the primary CPICH (or CRS) is known from system information from the network node (e.g. by broadcast of the network node), the UE can estimate the corresponding path loss. In a line-of-sight scenario, the attenuation of electromagnetic waves can be modeled by Friis transmission formula:

$$\frac{P_{RX}}{P_{TX}} = G_{RX} G_{TX} \left(\frac{\lambda}{4\pi \cdot r}\right)^2$$

where $P_{RX}/P_{TX}$ is the fraction of the transmitted power received by the device, $P_{RX}$ is the measured received power, $\lambda$ is the transmission wavelength and r is the distance from the base station antenna to the device. Thus, in line-of-sight conditions, the distance between the UE and the base station can be estimated as:

$$r = \frac{\lambda}{4\pi} \sqrt{G_{RX} G_{TX} \frac{P_{TX}}{P_{RX}}}$$

The base station transmission antenna gain factor $G_{TX}$ is already taken into account in the transmission power level broadcast in the system information. Hence, this gain factor can be assumed to be 1 in the expression above. The device receiver antenna gain factor $G_{RX}$ is known by the device and is taken into account when assessing the received power. Hence, this gain factor can also be assumed to be 1 in the expression above. The wavelength depends on the carrier frequency which is known to the device.

Thus, the transmission power used for the primary CPICH (or CRS) and/or the CPICH (or CRS) itself may take the role of the received signal of 120 and/or 140 of FIG. 1.

It should be noted that these equations for derivation of cell size are merely examples. In some (non-line-of-sight) scenarios, typically fading scenarios involving obstacles (buildings, mountains, etc) in, for example, dense urban scenarios, the fraction of the transmitted power received by the device is rather inversely proportional to $r^3$ or even $r^4$. If it is known or probable that a device in such a scenario, the cell radius can be estimated with alternative techniques. For example, the cell radius can be estimated by determination of the signal strength (e.g. RSRP or RSCP) at two different positions and application of a model using inverse proportionality to $r^{3.5}$. To estimate whether or not the device is in a dense urban scenario or not, knowledge of the position of the device (e.g. from a GPS integrated with the device) may be helpful. Together with a database (e.g. provided by the network or via the Internet—Google Earth or similar) containing information on where dense urban and other scenarios are applicable, a relevant propagation scenario may be determined.

Alternatively or additionally, the applicable propagation scenario may be estimated by the device using the detected propagation conditions of the received signal. For example, receiver information (e.g. a power delay profile (number of paths and/or delays between paths for example), equalizer setting, or similar) may be used as input to determine whether or not a line-of-sight scenario is applicable and also to distinguish between different non-line-of-sight scenarios (e.g. dense urban scenario).

Yet alternatively or additionally, the network may transmit information on the applicable propagation scenario (regarding its own and/or neighboring cells), for example in a broadcasted system information.

Having determined the relevant propagation scenario, that information may be used to determine which cell size estimation formula to use.

A further example of how the distance from the device to the location of the cell centre may be achieved is by measuring the signal strength (e.g. RSCP or RSRP) of cell and using positioning information (e.g. from a GPS integral to the device). Thus, the measured signal may take the role of the received signal of 120 and/or 140 of FIG. 1. The boundary of a cell is typically where the signal strength of the cell is experienced as weakest, and the centre of the cell is typically where the signal strength of the cell is experienced as highest.

The positioning coordinates may be noted when the signal strength of the cell is weakest and strongest. The distance between these positions may be easily calculated based on the noted coordinates and gives an estimate of the radius of the cell. The estimate is best if the device travels past the cell centre, but may be reasonable also in other scenarios. It should be noted that this example cannot be applied to determine the size of the new cell at the cell switch moment. For the cell size of the new cell, either a previously calculated and stored value should be used and/or another cell size determination method.

Alternatively, the positioning coordinates may be noted when the signal strength of the cell is weakest (e.g. at cell border, at cell switch moment, etc.). The position of the network node may be provided in another way. Thus, the network node position information may also be part of the received signal of 120 and/or 140 of FIG. 1. For example, the network node may broadcast its own position coordinate information (e.g. in a system information field) and/or position information of neighboring nodes. Another example is when a database is accessible (e.g. via the network or via the Internet) and containing information comprises positioning coordinate information for network nodes. As before, the distance between the position of the device and the position of the network node may be easily calculated based on the coordinates and this gives an estimate of the radius of the cell.

Yet alternatively, the positioning coordinates may be noted in at least three different locations where the signal strength of the cell is weakest. The size of the cell may then be estimated using a triangulation method.

In some embodiments, the positioning assisted cell size determination methods are only performed if the positioning unit (e.g. GPS) of the device is already turned on by the user. In such embodiments, a negative effect on the battery consumption due to excessive use of the positioning unit is avoided. In these embodiments, historic cell size determinations may be stored in the device to assist cell switch when the positioning unit is not in use. Alternatively or additionally, another cell size determination method may be implemented and used to assist cell switch when the positioning unit is not in use.

Figure 2:
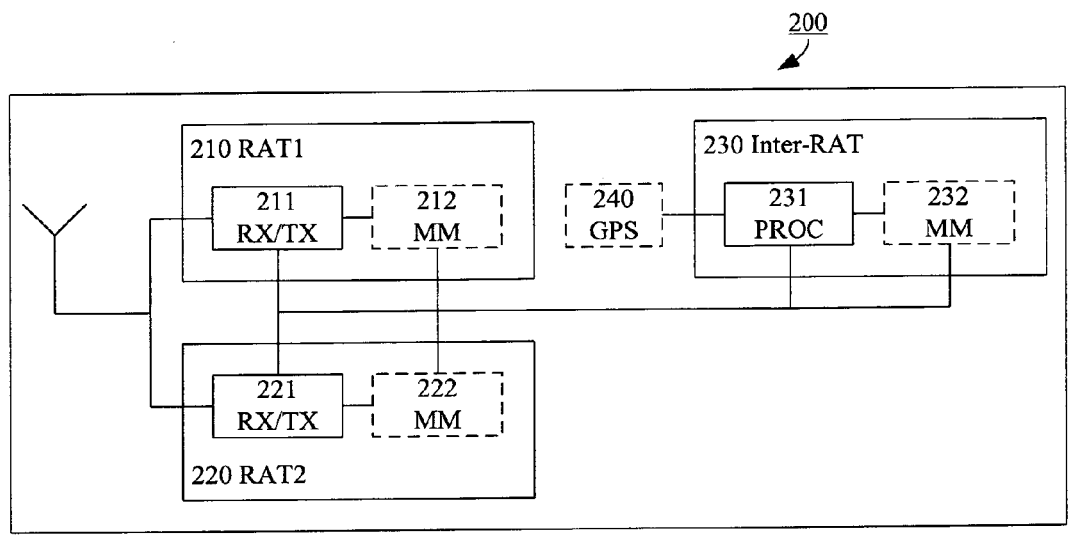
FIG. 2 is a block diagram illustrating an example arrangement according to some embodiments.

FIG. 2 is a schematic block diagram illustrating an arrangement according to some embodiments. The arrangement may, for example be comprised in a wireless communication device 200, such as e.g. a mobile telephone, a modem, a laptop, etc. The arrangement may, for example, be adapted to carry out method steps of method 100 described in connection to FIG. 1.

The arrangement of FIG. 2 illustrates a situation where communication with two different RATs (RAT1 and RAT2) is possible. To this end, the arrangement comprises a first RAT unit 210 and a second RAT unit 220. However, it should be noted that according to some embodiments the arrangement may have different capabilities and may correspondingly comprise a single RAT unit or more than two RAT units.

The respective RAT units 210 and 220 each comprise a transceiver 211, 221. The transceivers 211 and 221 are adapted to receive a signal related to a cell. As has been exemplified above, the signal may be received from a network related to the cell, e.g. from a network node serving the cell or from a network node serving a neighboring cell. Alternatively, it may be received from another source as has also been exemplified above. The signal may comprise a direct indication of the size of the old cell. Alternatively, the signal may comprise no direct indication of the size of the old cell, but may be used by the device to determine the size of the old cell. Examples of signaling relevant for these purposes will be described further in connection to various examples relating to the cell size determination.

The arrangement also comprises at least one processor 231. The one or more processor 231 may be comprised in one or more of the RAT units 210 and 220. Alternatively or additionally, the processor 231 may be external to the RAT units 210, 220. For example, the processor 231 may be comprised in an inter-RAT unit 230 as illustrated in FIG. 2. The one or more processor 231 is adapted to determine a size of the cell based on the signal received by the transceiver 211, 221. For example, the determination may be carried out according to any of the methods that have been described herein. The determination may be performed by a processor specific for the RAT relating to the cell, or it may be performed by an inter-RAT processor 231.

In association with a cell switch, the processor 231 is further adapted to scale at least one mobility parameter (e.g. cell switch counter and/or one or more network provided mobility parameters) relating to the cell to be switched from based on the determined sizes of the first and second cells. For example, the scaling may be carried out according to any of the methods that have been described herein. The scaling may be performed by a processor specific for the RAT(s) relating to any of the cells involved in the cell switch, or it may be performed by an inter-RAT processor 231. The mobility parameters to be scaled may be provided by a mobility manager 212, 222, 232 relating to the cell to be switched from, and the scaled mobility parameters may be provided to a mobility manager 212, 222, 232 relating to the cell to be switched to.

The arrangement thus comprises at least one mobility manager 212, 222, 232, which is adapted to perform mobility management in a cell based on the scaled mobility parameters. The one or more mobility manager 212, 222, 232 may be comprised in one or more of the RAT units 210 and 220. Alternatively or additionally, the mobility manager 212, 222, 232 may be external to the RAT units 210, 220. These alternatives are illustrated in FIG. 2.

A positioning unit 240 may optionally be comprised in the arrangement as illustrated in FIG. 2. The positioning unit 240 may, for example, be a GPS receiver. If present, data from the positioning unit 240 may be used in the cell size determination of the processor 231 (for example as described previously herein).

The described embodiments of the invention and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of the invention.

The invention may be embodied within an electronic apparatus comprising circuitry/logic or performing methods according to any of the embodiments of the invention. The electronic apparatus may be a wireless communication device such as, for example, a portable or handheld mobile radio communication equipment, a mobile radio terminal, a mobile telephone, a modem, a relay, a PDA, a communicator, an electronic organizer, a smartphone, a computer (e.g. laptop), a notebook, an embedded drive, or a mobile gaming device.

Figure 3:
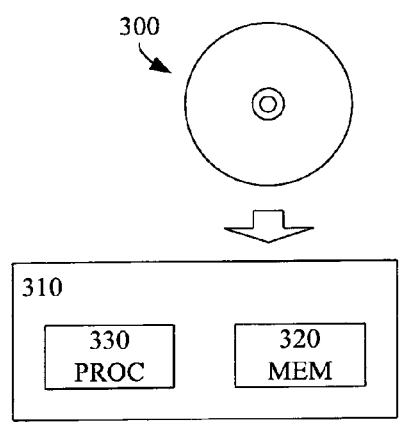
FIG. 3 is a schematic drawing illustrating a computer readable medium according to some embodiments.

According to some embodiments of the invention, a computer program product comprises a computer readable medium such as, for example, a diskette or a CD-ROM as exemplified by 300 of FIG. 3. The computer readable medium may have stored thereon a computer program comprising program instructions. The computer program may be loadable into a data-processing unit 330, which may, for example, be comprised in a wireless communication device 310. When loaded into the data-processing unit 330, the computer program may be stored in a memory 320 associated with or integral to the data-processing unit 330. According to some embodiments, the computer program may, when loaded into and run by the data-processing unit, cause the data-processing unit to execute method steps according to, for example, the method shown in FIG. 1.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the scope of the invention is defined by the appended claims rather than by the description, and all variations that fall within the range of the claims are intended to be embraced therein.

The invention claimed is:

1. A mobility management method of a wireless communication device capable of communication with a wireless communication network according to at least a first radio access technology, the method comprising, when the wireless communication device performs a cell switch from a first cell to a second cell:
receiving a first signal related to the first cell;
calculating a size of the first cell, based on the first signal, as an estimated distance from the wireless communication device to a base station of the first cell;
receiving a second signal related to the second cell;
calculating a size of the second cell, based on the second signal, as an estimated distance from the wireless communication device to a base station of the second cell;
scaling at least one mobility parameter based on the determined sizes of the first and second cells, wherein the at least one mobility parameter is scaled by a ratio or quantized ratio between the determined sizes of the first and second cells;
performing mobility management in the second cell based on the at least one scaled mobility parameter.

2. The method of claim 1, wherein:
the wireless communication device is capable of communication with the wireless communication network according to at least a first radio access technology and a second radio access technology;
the first cell operates according to the first radio access technology and the second cell operates according to the second radio access technology.

3. The method of claim 1, wherein at least one of the first and second distances is estimated based on at least one of:
an attenuation experienced by a signal transmitted from a base station of the respective cell and received at the wireless communication device;
a delay experienced by a signal transmitted from a base station of the respective cell and received at the wireless communication device.

4. The method of claim 1, wherein at least one of the first and second distances is estimated based on a power of a reference signal received from the respective cell.

5. The method of claim 4, wherein the distance (r) is estimated as $$r = \frac{\lambda}{4\pi}\left(G_{RX}G_{TX}\frac{P_{TX}}{P_{RX}}\right)^{1/x}$$

where $\lambda$ is a transmission wavelength of the reference signal, $P_{RX}$ is a received power of the reference signal, $P_{TX}$ is a transmitted power of the reference signal, $G_{TX}$ is an antenna gain factor of the base station of the respective cell, $G_{RX}$ is an antenna gain factor of the wireless communication device, and x is equal to a number between two and four inclusive.

6. The method of claim 5, wherein x is equal to 2 in a line-of-sight scenario and x is equal to 3, 3.5, or 4 in a non-line-of-sight scenario.

7. The method of claim 1, wherein at least one of the first and second distances is further estimated based on positioning information of the wireless communication device and of a base station of the respective cell.

8. The method of claim 1, wherein at least one of the first and second distances is estimated based on a timing advance indication received from the respective cell.

9. The method of claim 8, wherein the distance is estimated as the timing advance multiplied with the speed of light divided by two.

10. The method of claim 1, wherein at least one of the first and second distances is estimated based on a cell overlap between the first and second cells.

11. The method of claim 10, wherein the cell overlap is based on a hysteresis value signaled by the wireless communication network.

12. The method of claim 10:
wherein an intermediate estimate of the at least one of the first and second distances is estimated based on at least one of:
an attenuation experienced by a signal transmitted from a base station of the respective cell and received at the wireless communication device;
a delay experienced by a signal transmitted from a base station of the respective cell and received at the wireless communication device;
a power of a reference signal received from the respective cell;
positioning information of the wireless communication device and of a base station of the respective cell;

a timing advance indication received from the respective cell;
wherein the at least one of the first and second distances is estimated as the intermediate estimate plus the cell overlap.

13. The method of claim 1, wherein the at least one mobility parameter is scaled by a ratio between the determined sizes of the first and second cells.

14. The method of claim 1, further comprising performing the cell switch from the first cell to the second cell.

15. The method of claim 1, wherein the performing mobility management in the second cell comprises determining an initial mobility state of the second cell based on the at least one scaled mobility parameter.

16. The method of claim 15, wherein the performing mobility management in the second cell comprises scaling cell switch parameters of the second cell based on the initial mobility state.

17. The method of claim 1, wherein the at least one mobility parameter comprises one or more of:
a cell switch count;
one or more mobility state thresholds.

18. A computer program product stored in a non-transitory computer readable medium for mobility management of a wireless communication device capable of communication with a wireless communication network according to at least a first radio access technology, the computer program product comprising software instructions which, when run on one or more processing circuits, causes the data processing circuits to, when the wireless communication device performs a cell switch from a first cell to a second cell:
receive a first signal related to the first cell;
calculate a size of the first cell, based on the first signal, as an estimated distance from the wireless communication device to a base station of the first cell;
receive a second signal related to the second cell;
calculate a size of the second cell, based on the second signal, as an estimated distance from the wireless communication device to a base station of the second cell;
scale at least one mobility parameter based on the determined sizes of the first and second cells, wherein the at least one mobility parameter is scaled by a ratio or quantized ratio between the determined sizes of the first and second cells;
perform mobility management in the second cell based on the at least one scaled mobility parameter.

19. An arrangement for a wireless communication device capable of communication with a wireless communication network according to at least a first radio access technology, the arrangement comprising:
a receiver configured to receive a first signal related to a first cell and a second signal related to a second cell;
one or more processing circuits configured to, when the wireless communication device performs a cell switch from the first cell to the second cell:
calculate a size of the first cell based on the first signal as an estimated distance from the wireless communication device to a base station of the first cell;
calculate a size of the second cell based on the second signal as an estimated distance from the wireless communication device to a base station of the second cell;
scale at least one mobility parameter based on the determined sizes of the first and second cells, wherein the at least one mobility parameter is scaled by a ratio or quantized ratio between the determined sizes of the first and second cells;
perform mobility management in the second cell based on the at least one scaled mobility parameter.

20. The arrangement of claim 19, wherein:
the wireless communication device is capable of communication with a wireless communication network according to at least a first and a second radio access technology;
the first cell operates according to the first radio access technology and the second cell operates according to the second radio access technology;
the receiver comprises a first receiver of the first radio access technology and a second receiver of the second radio access technology.

21. The arrangement of claim 19:
further comprising a positioning circuit;
wherein the one or more processing circuits are configured to estimate at least one of the first and second distances based on positioning information of the wireless communication device and of a base station of the respective cell, supplied by the positioning circuit.

22. A wireless communication device capable of communication with a wireless communication network according to at least a first radio access technology, the wireless communication device comprising:
a receiver configured to receive a first signal related to a first cell and a second signal related to a second cell;
one or more processing circuits configured to, when the wireless communication device performs a cell switch from the first cell to the second cell:
calculate a size of the first cell based on the first signal as an estimated distance from the wireless communication device to a base station of the first cell;
calculate a size of the second cell based on the second signal as an estimated distance from the wireless communication device to a base station of the second cell;
scale at least one mobility parameter based on the determined sizes of the first and second cells, wherein the at least one mobility parameter is scaled by a ratio or quantized ratio between the determined sizes of the first and second cells;
perform mobility management in the second cell based on the at least one scaled mobility parameter.

23. The wireless communication device of claim 22, wherein:
the wireless communication device is capable of communication with a wireless communication network according to at least a first and a second radio access technology;
the first cell operates according to the first radio access technology and the second cell operates according to the second radio access technology;
the receiver comprises a first receiver of the first radio access technology and a second receiver of the second radio access technology.

24. The wireless communication device of claim 22:
further comprising a positioning circuit;
wherein the one or more processing circuits are configured to estimate at least one of the first and second distances based on positioning information of the wireless communication device and of a base station of the respective cell, supplied by the positioning circuit.

25. The method of claim 1, wherein the at least one mobility parameter is scaled by a quantized ratio between the determined sizes of the first and second cells.

* * * * *